United States Patent [19]

Block et al.

[11] Patent Number: 5,176,732
[45] Date of Patent: Jan. 5, 1993

[54] METHOD FOR MAKING LOW SODIUM HOLLOW GLASS MICROSPHERES

[75] Inventors: Jacob Block, Rockville; John W. Lau, Gaithersburg, both of Md.; Roy W. Rice, Alexandria, Va.; Anthony J. Colageo, Sharon, Mass.

[73] Assignee: W. R. Grace & Co.-Conn., New York, N.Y.

[21] Appl. No.: 758,915

[22] Filed: Sep. 10, 1991

Related U.S. Application Data

[63] Continuation-in-part of Ser. No. 632,199, Dec. 20, 1990, Pat. No. 5,069,702.

[51] Int. Cl.⁵ .............................. C03B 19/10
[52] U.S. Cl. ................................ 65/21.4; 65/22; 501/33; 501/39; 501/59
[58] Field of Search ............... 65/21.4, 22; 501/33, 501/39, 59

[56] References Cited

U.S. PATENT DOCUMENTS

| | | | |
|---|---|---|---|
| 3,061,495 | 10/1962 | Alford | 65/21.4 X |
| 3,365,315 | 1/1968 | Beck | 65/21.4 X |
| 3,699,050 | 10/1972 | Henderson | 65/21.4 X |
| 4,119,422 | 10/1978 | Rostoker | 65/22 |
| 4,336,338 | 6/1982 | Downs et al. | 501/12 |
| 4,442,175 | 4/1984 | Flannery | 65/21.4 X |
| 4,751,203 | 6/1988 | Toussaint et al. | 501/33 |
| 4,767,726 | 8/1988 | Marshall | 501/33 |
| 4,904,293 | 2/1990 | Garnier et al. | 65/21.4 |
| 4,983,550 | 1/1991 | Goetz et al. | 501/33 |
| 5,064,784 | 11/1991 | Saito et al. | 501/33 |

FOREIGN PATENT DOCUMENTS 9002102  3/1990  World Int. Prop. O. .

Primary Examiner—Robert L. Lindsay
Attorney, Agent, or Firm—Steven Capella

[57] ABSTRACT

Low sodium hollow glass microspheres containing less than about 3 wt. % $Na_2O$ are produced from aqueous precursors. The method comprises a) forming an aqueous glass precursor solution or slurry by combining sources of cations contained in the glass, the solution or slurry comprising all of the glass cations in proportions substantially identical to those in the glass, b) forming the solution or slurry into droplets, and c) heating the droplets to form the microspheres.

The precursor may also contain surfactants, blowing agents or other known expedients. Nonionic fluorocarbon surfactants are preferred.

The droplets may be formed by spraying or any other known technique. The droplets may be spray dried prior to heating step c).

20 Claims, No Drawings

METHOD FOR MAKING LOW SODIUM HOLLOW GLASS MICROSPHERES

This application is a continuation-in-part of U.S. patent application Ser. No. 632,199 filed Dec. 20, 1990, now U.S. Pat. No. 5,069,702, granted 12/3/1991.

FIELD OF THE INVENTION

This invention relates to methods for producing small hollow glass spheres having a low sodium content.

BACKGROUND OF THE INVENTION

Small hollow glass spheres (microspheres) are useful as fillers in various organic and inorganic matrices for a wide variety of industrial applications. These microspheres can be used to achieve special properties such as low dielectric constant, high strength-to-weight ratio, and low thermal conductivity.

In electronics applications, microspheres having low sodium content are often preferred. Sodium cations are highly mobile positive charge carriers which can have adverse effects on the performance of electronics exposed to the cations.

While low sodium content in the glass microspheres is desirable for electronics applications, low sodium glasses present difficulties in the manufacture of microspheres. Low sodium glasses generally have higher viscosities at higher temperatures than conventional glass compositions. Blowing or expansion agents, used to promote expansion of the glass into hollow spheres, are often volatilized before the low sodium glass reaches a low enough viscosity for microsphere formation.

Conventional methods for producing low sodium glass microspheres from aqueous precursors involve production of microspheres from relatively high sodium content glass. An aqueous sodium silicate precursor (i.e. water glass) is formed into droplets and heated to form high sodium microspheres which are then treated to remove the sodium by leaching or some other method. This sodium removal step adds extra time and cost to the production of low sodium microspheres.

Another method involves the use of low sodium glass powder which is heated to form low sodium balloons. However, in this method, a finely divided glass frit is needed in order to form good balloon spheres. The preparation of such a frit is time consuming and expensive.

Methods using organic precursor gels have been proposed, however such methods often are expensive, difficult to control, or otherwise ineffective. Accordingly, there remains a need for a simple, economical process for reliably producing low sodium hollow glass microspheres.

SUMMARY OF THE INVENTION

The invention provides an inexpensive method for producing low sodium hollow glass microspheres using low sodium aqueous glass precursors.

In one aspect, the invention provides a method of making low sodium hollow glass microspheres containing less than about 3 wt. % $Na_2O$, the method comprising:
a) forming an aqueous glass precursor solution or slurry by combining sources of cations contained in the glass, the solution or slurry comprising all of the glass cations in proportions substantially identical to those in the glass,
b) forming the solution or slurry into droplets, and
c) heating the droplets to form the microspheres.

The precursor may also contain surfactants, blowing agents or other known expedients. Nonionic fluorocarbon surfactants are preferred.

The droplets may be formed by spraying or any other known technique. The droplets may be spray dried prior to heating step c).

The glass is preferably an aluminum borosilicate glass containing less than about 3 wt. % $Na_2O$. One preferred glass composition is Corning 7052 which contains (in wt. %):

| | |
|---|---|
| $SiO_2$ | 64 |
| $B_2O_3$ | 19 |
| $Al_2O_3$ | 8 |
| $K_2O$ | 3 |
| BaO | 3 |
| $Na_2O$ | 2 |
| LiF | 1 |

DETAILED DESCRIPTION OF THE INVENTION

The basic method of the invention comprises:
a) forming an aqueous glass precursor solution or slurry containing the cations of the glass in about the same proportions as in the glass,
b) forming the solution or slurry into droplets, and
c) heating the droplets to form hollow glass microspheres.

The precursor solution or slurry may be formed by combining appropriate sources and amounts of the cations needed to form the low sodium glass. The cation sources are preferably water soluble salts, sols or finely divided powders. The precursor solution may additionally contain surfactants or blowing agents.

Suitable soluble salts include nitrates, carbonates, acetates, fluorides, or other soluble salts. The boron may be supplied as boric acid or any other suitable silica powder, or any other suitable source. The combination of the various sources is ultimately limited by the cation proportions in the final glass microsphere. Since the process of the invention does not use a leaching step, excess sodium is preferably avoided in the precursor.

Generally, the cations of the precursor are either already present as part of an oxide (e.g. $SiO_2$) or become oxides on heating of the precursor droplets. The anions of the precursor may be any which volatilize and/or react to form oxides on heating. Certain anions may act as blowing agents on heating of the droplets or may effect the density of the microsphere product.

The actual glass composition in the microspheres is preferably an aluminum borosilicate glass containing less than 3 wt. % $Na_2O$. More preferably, the glass contains the following (in wt. %):

| | |
|---|---|
| $SiO_2$ | 64 |
| $B_2O_3$ | 19 |
| $Al_2O_3$ | 8 |
| $K_2O$ | 3 |
| BaO | 3 |
| $Na_2O$ | 2 |
| LiF | 1 |

This glass composition is known as Corning #7052.

In addition to the constituents necessary to form the glass, the precursor may also contain any known expedients such as surfactants or blowing agents. Nonionic fluorocarbon surfactants, such as those disclosed in U.S. Patent Application Serial No. 632,199, U.S. Pat. No. 5,069,702, are preferred. The disclosure of U.S. Pat. No. 5,069,702 is incorporated herein by reference. Urea and glycerol are preferred blowing agents.

The aqueous precursor solution or slurry may be formed using any conventional mixing technique. The precursor is then preferably formed into droplets. This is preferably done by spraying the precursor, however, other known techniques may be used. The droplets may be heated to form microspheres by spraying directly into a flame. Alternatively, droplets may be spray-dried prior to the heating step.

The heating step may be performed using any conventional technique. For example, the droplets may be fed into a gas flame furnace or may be heated using microwave radiation. Preferably, the droplets are heated to at least about 920°. Lower density microspheres may be obtained by heating to higher temperatures (e.g. about 1200° C.).

The microspheres obtained from the heating step have approximately the identical cation composition to the composition in the precursor. No leaching or other post treatment is needed to reduce the sodium content to acceptable levels.

The invention is further illustrated by the following examples. The invention is not limited to the particulars of the examples.

Example 1

This example illustrates the preparation of low sodium hollow glass spheres having densities about 1.6 g/cc.

A precursor slurry was prepared by dissolving 1343.2g $Al(NO_3)_3.9H_2O$, 116.6g $NaNO_3$, 149.5 g $KNO_3$, 117.3 g $Ba(NO_3)_2$ and 775.1 g $H_3BO_3$ in 14,800 g deionized $H_2O$. To this was added 1472g of fine silica powder (Sylox®-2, W. R. Grace & Co.) and 23.0g LiF. Urea (42.1 g) was added as a blowing agent.

The slurry was spray-dried at an inlet temperature of 250° C. and an outlet temperature of 109-138° C. The spray-dried product was than fed into a gas flame furnace (920° C.). The product was collected and was found to be hollow glass microspheres about 5-40 microns in diameter. The density of the products was about 1.6 g/cc.

EXAMPLE 2

This example shows that a silica sol can be used instead of the fine silica powder.

The experiment described in example 1 was repeated, with the exception that 3680g of Ludox® HS-40 (DuPont) silica sol was added instead of the Sylox®-2. (The $NaNO_3$ was reduced to 85.1 g).

The resultant product had a density of 1.6-1.7 g/cc. The microsphere diameter was about 5 microns.

EXAMPLE 3

This example shows the effect of increasing the urea (blowing agent) concentration.

The experiment described in example 1 was repeated with the exception that the urea concentration was increased approximately 12 fold to 494.4g. The average density of the product was reduced to about 1.3g/cc. Sphere diameter was about 20-30 microns.

EXAMPLE 4

This example shows that a density around 1.39 g/cc can be obtained with small amounts of urea and glycerol.

The experiment described in example 3 was repeated with the exception that the urea was reduced to 82.4 g and 82.4 g of glycerol were added. The resulting product was hollow glass spheres having a density about 1.3 g/cc. Diameters were about 15-30 microns.

EXAMPLE 5

This example shows that balloon densities as low as 0.5 g/cc can be obtained by using a carbonate/acetate based precursor system instead of a nitrate based system.

A precursor slurry was prepared by dissolving 503 g basic aluminum acetate stabilized with boric acid (Al$(OH)_2CH_3COO.\frac{1}{3}H_3BO_3$), 112.4 g barium acetate, 697.9 g boric acid, 72.6g sodium carbonate, 102.3 g potassium carbonate, 22.2 ammonium fluoride, and 32.9 g lithium carbonate in 15,000 g of deionized water. To this was added 1472 g fine silica powder (Sylox®-2, W. R. Grace & Co.), 82.4 g glycerol and 16.0 g of Zonyl® FSN (a fluorocarbon surfactant manufactured by E. I. DuPont).

The slurry was spray-dried at an inlet temperature of 200° C. and an outlet temperature of 97-102° C.

The spray dried product was then fed into a furnace as in example 1. Furnace temperature was about 1200° C. The product was hollow glass spheres having densities between 0.50 and 0.77 g/cc. Product size was 5-30 microns.

EXAMPLE 6

This example shows hollow glass spheres can be made directly from a liquid precursor, thus avoiding the drying step.

Three liquid feed precursors were prepared. The first was identical to the slurry described in example 1, the second was identical to the slurry described in example 2, and the third was the same as the second, with all nitrates replaced with the equivalent amount of acetate.

All three slurries were pumped into a gas flame at about 1150° C, and the product exiting the flame was collected. Hollow glass spheres were formed in all cases, and sizes ranged from 5-10 microns in diameter. Particle densities of the balloons were: 1.7, 1.6 and 1.4 g/cc for slurries 1, 2 and 3 respectively.

What is claimed is:

1. A method of making low sodium hollow glass microspheres containing less than about 3 wt. % $Na_2O$ and having a density of about 0.5-1.3 g/cc, said method comprising:
    a) forming an aqueous glass precursor solution or slurry by combining glycerol and sources of cations contained in said glass, said solution or slurry comprising all of said glass cations in proportions substantially identical to those in said glass,
    b) forming said solution or slurry into droplets, and
    c) heating said droplets to form said microspheres.

2. The method of claim 1 wherein said solution or slurry further comprises a surfactant.

3. The method of claim 1 wherein said solution or slurry further comprises a urea blowing agent.

4. The method of claim 1 wherein said glass is an aluminum borosilicate glass.

5. The method of claim 4 wherein said glass comprises about 2 wt. % Na$_2$O.

6. The method of claim 1 wherein said droplets are formed by spraying.

7. The method of claim 1 wherein said heating step c) comprises feeding said droplets into a flame.

8. The method of claim 2 wherein said surfactant comprises a fluorocarbon surfactant.

9. The method of claim 7 wherein said droplets are heated to at least about 920° C.

10. The method of claim 5 wherein said glass comprises about

| | |
|---|---|
| 64 wt. % | SiO$_2$ |
| 19 wt. % | B$_2$O$_3$ |
| 8 wt. % | Al$_2$O$_3$ |
| 3 wt. % | K$_2$O |
| 3 wt. % | BaO |
| 2 wt. % | Na$_2$O |
| 1 wt. % | LiF. |

11. A method of making low sodium hollow glass microspheres containing less than about 3 wt. % Na$_2$O and having a density of about 0.5–1.3 g/cc, said method comprising:
   a) forming an aqueous glass precursor solution or slurry by combining glycerol and sources of cations contained in said glass, said solution or slurry comprising all of said glass cations in proportions substantially identical to those in said glass,
   b) forming said solution or slurry into droplets, and
   c) drying said droplets, and
   d) heating said droplets to form said microspheres.

12. The method of claim 11 wherein said solution or slurry further comprises a surfactant.

13. The method of claim 12 wherein said surfactant comprises a nonionic fluorocarbon surfactant.

14. The method of claim 11 wherein said solution or slurry further comprises a urea blowing agent.

15. The method of claim 11 wherein steps b) and c) are performed by spray-drying said solution or slurry.

16. The method of claim 11 wherein said heating step d) comprises feeding said dried droplets into a flame.

17. The method of claim 16 wherein said droplets are heated to at least about 920° C.

18. The method of claim 11 wherein said glass is an aluminum borosilicate glass.

19. The method of claim 18 wherein said glass comprises about 2 wt. % Na$_2$O.

20. The method of claim 19 wherein said glass comprises about

| | |
|---|---|
| 64 wt. % | SiO$_2$ |
| 19 wt. % | B$_2$O$_3$ |
| 8 wt. % | Al$_2$O$_3$ |
| 3 wt. % | K$_2$O |
| 3 wt. % | BaO |
| 2 wt. % | Na$_2$O |
| 1 wt. % | LiF. |

* * * * *